United States Patent
Chintalapati et al.

(10) Patent No.: US 9,499,889 B2
(45) Date of Patent: Nov. 22, 2016

(54) STAINLESS STEEL ALLOYS, TURBOCHARGER TURBINE HOUSINGS FORMED FROM THE STAINLESS STEEL ALLOYS, AND METHODS FOR MANUFACTURING THE SAME

(71) Applicant: HONEYWELL INTERNATIONAL INC., Morristown, NJ (US)

(72) Inventors: Pavan Chintalapati, Bangalore (FR); Marc Wilson, Deyvillers (FR); Rayad Benchiheub, Fameck (FR); Ted Pozniak, Stockport (GB)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 363 days.

(21) Appl. No.: 14/188,083

(22) Filed: Feb. 24, 2014

(65) Prior Publication Data
US 2015/0240334 A1    Aug. 27, 2015

(51) Int. Cl.
*C22C 38/34* (2006.01)
*C22C 38/02* (2006.01)
*C22C 38/04* (2006.01)
(Continued)

(52) U.S. Cl.
CPC ............ *C22C 38/34* (2013.01); *C22C 38/002* (2013.01); *C22C 38/02* (2013.01); *C22C 38/04* (2013.01); *C22C 38/22* (2013.01); *C22C 38/26* (2013.01); *F01D 25/005* (2013.01); *F02C 6/12* (2013.01); *F02D 2001/0065* (2013.01); *F05D 2220/40* (2013.01); *F05D 2300/132* (2013.01); *F05D 2300/161* (2013.01); *F05D 2300/171* (2013.01); *F05D 2300/177* (2013.01)

(58) Field of Classification Search
CPC ...... C22C 38/02; C22C 38/002; C22C 38/04; C22C 38/22; C22C 38/26; C22C 38/34; C22C 38/40; C22C 38/44; C22C 38/48; C22C 35/00; C22C 30/00; C22C 37/00; F01D 25/005; F02C 6/12
USPC .......................................................... 420/38
See application file for complete search history.

(56) References Cited

U.S. PATENT DOCUMENTS 2,580,171 A   12/1951   Hagglund et al.
2,709,132 A    5/1955   Giles
(Continued)

FOREIGN PATENT DOCUMENTS

EP   0530604 A2   3/1993
EP   1826288 A1   2/2007
(Continued)

OTHER PUBLICATIONS

EP Search Report for Application No. EP 15168776.1 dated Feb. 1, 2016.
(Continued)

*Primary Examiner* — Kaj K Olsen
*Assistant Examiner* — Alexandra M Moore
(74) *Attorney, Agent, or Firm* — Lorenz & Kopf, LLP (57) ABSTRACT

Disclosed is an ferritic stainless steel alloy that includes, by weight, about 20% to about 22% chromium, about 0% to about 0.5% nickel, about 0.5% to about 1.0% manganese, about 1.0% to about 2.5% silicon, about 1.5% to about 2.2% tungsten, about 1.3% to about 1.8% niobium, about 0.35% to about 0.45% carbon, and a balance of iron. The alloy is suitable for use in turbocharger turbine housing applications for temperature up to about 1050° C.

16 Claims, 3 Drawing Sheets

(51) Int. Cl.
*C22C 38/22* (2006.01)
*C22C 38/26* (2006.01)
*F01D 25/00* (2006.01)
*F02C 6/12* (2006.01)
*C22C 38/00* (2006.01)
*F02D 1/00* (2006.01)

(56) References Cited

U.S. PATENT DOCUMENTS

| | | | |
|---|---|---|---|
| 3,086,858 | A | 4/1963 | Edminster et al. |
| 3,617,258 | A | 11/1971 | Terada |
| 5,795,540 | A | 8/1998 | Dwars et al. |
| 6,406,563 | B2 | 6/2002 | Kawano et al. |
| 6,511,554 | B1 | 1/2003 | Kawano et al. |
| RE40,950 | E | 11/2009 | Ota et al. |
| 7,806,993 | B2 | 10/2010 | Miyazaki et al. |
| 8,153,055 | B2 | 4/2012 | Nakamura et al. |
| 2003/0165394 | A1 | 9/2003 | Kloss-Ulitzka et al. |
| 2004/0166015 | A1 | 8/2004 | Kimura |
| 2004/0226634 | A1 | 11/2004 | Hirasawa et al. |
| 2005/0211348 | A1 | 9/2005 | Miyazaki et al. |
| 2008/0107947 | A1 | 5/2008 | Jackson et al. |
| 2009/0053092 | A1 | 2/2009 | Sandstrom et al. |
| 2010/0098994 | A1 | 4/2010 | Schuisky et al. |
| 2010/0150770 | A1 | 6/2010 | Hiraide et al. |
| 2010/0189588 | A1 | 7/2010 | Kawatsu et al. |
| 2011/0008200 | A1 | 1/2011 | Kato et al. |
| 2011/0033731 | A1 | 2/2011 | Kawano et al. |
| 2011/0064601 | A1 | 3/2011 | Liljas et al. |
| 2012/0273092 | A1 | 11/2012 | Ratte et al. |
| 2012/0321501 | A1 | 12/2012 | Chae et al. |
| 2013/0022488 | A1 | 1/2013 | Genma et al. |

FOREIGN PATENT DOCUMENTS

| | | |
|---|---|---|
| EP | 1826288 A1 | 8/2007 |
| EP | 2623623 A1 | 8/2013 |
| JP | 0655511 A1 | 5/1995 |
| JP | 000204946 A1 | 7/2000 |
| JP | 07197209 A | 7/2000 |
| JP | 2000204946 A2 | 7/2000 |
| WO | 2012170210 A2 | 12/2012 |

OTHER PUBLICATIONS

EP Extended Search Report for Application No. EP 15154766.8 dated Feb. 2, 2016.

STAINLESS STEEL ALLOYS, TURBOCHARGER TURBINE HOUSINGS FORMED FROM THE STAINLESS STEEL ALLOYS, AND METHODS FOR MANUFACTURING THE SAME

TECHNICAL FIELD

The present disclosure generally relates to stainless steel alloys. More particularly, the present disclosure relates to stainless steel alloys used for casting applications, for example turbocharger housings and exhaust manifolds, that exhibit oxidation resistance at elevated temperatures, and method for manufacturing the same.

BACKGROUND

During operation, automotive turbocharger housings are subjected to elevated operating temperatures. These housings must be able to contain a turbine wheel rotating at very high speeds. Exhaust gas from the automotive initially contacts the turbocharger in metal sections, such as the gas inlet area of the turbocharger, at elevated temperatures. As high-speed performance improves through exhaust temperature increase, there have been attempts to gradually raise the exhaust temperature of the engine. Due to these high temperatures, the thermal load on the parts such as the exhaust manifold and the turbine housing becomes very great.

Various problems have been encountered by these increased exhaust gas temperatures contacting metal sections of the turbocharger. For example, one problem caused by the exhaust temperature rise is the problem of thermal deformation of the material, wherein the turbine housing and exhaust manifold, which alternates between regions of high temperature and low temperature is accompanied by thermal expansion and contraction depending on the situation, which can cause surface oxidation, and develop into a crack or other failure mode.

In order to overcome the challenges associated with higher operating temperatures, prior art alloys used in turbocharger applications have included alloys of higher nickel content such as commercially available high nickel ductile iron casting alloys. Examples of these are NiResist™ developed by the International Nickel Company, or HK40, a chromium-nickel-iron stainless steel alloy containing approximately 25% chromium and 20% nickel, with the balance essentially iron. The HK series stainless steel alloys, such as the HK40 alloy noted herein, in general have about 18-22% nickel and are fully austenitic.

The HK stainless steel alloys are strong stainless steel casting alloys, in terms of creep strength. However, while meeting the high temperature property requirements for turbocharger housings, they are quite expensive because of their high nickel content. Further, due to the sudden rise of the Ni price recently, there has been substantial concern over the cost of materials that have a relatively high nickel content.

For lower temperature applications, ferritic stainless steel GX40 is currently recommended for operation until 900° C., beyond which austenitic materials such as NiResist and HK40 are preferred. Due to the high nickel content of these austenitic steels, a ferritic steel alternative is cheaper and attractive. The application of commercially available ferritic stainless steels such as GX40 is limited to temperatures below 900° C. due to less stable ferrite phase and lower oxidation resistance beyond this temperature. Any modification to the chemistry, which can improve the ferrite phase stability and oxidation resistance and thus increase the operating temperature will be present a cheaper alternative to austenitic grades.

Accordingly, there is a need for stainless steel alloys useful in turbocharger applications that are able to withstand the higher operating temperatures produced by modern engines, but that minimize the expensive nickel content. Ideally, a ferritic stainless steel would be employed that does not include any nickel content at all. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Stainless steel alloys, turbocharger turbine housings, and methods of manufacturing turbocharger turbine housings are provided. In an embodiment, by way of example only, a ferritic stainless steel alloy includes, by weight, about 20% to about 22% chromium, about 0% to about 0.5% nickel, about 0.5% to about 1.0% manganese, about 1.0% to about 2.5% silicon, about 1.5% to about 2.2% tungsten, about 1.3% to about 1.8% niobium, about 0.35% to about 0.45% carbon, and a balance of iron.

In another embodiment, by way of example only, a turbocharger turbine housing includes an ferritic stainless steel alloy that includes, by weight, about 20% to about 22% chromium, about 0% to about 0.5% nickel, about 0.5% to about 1.0% manganese, about 1.0% to about 2.5% silicon, about 1.5% to about 2.2% tungsten, about 1.3% to about 1.8% niobium, about 0.35% to about 0.45% carbon, and a balance of iron.

In yet another embodiment, a method of fabricating a turbocharger turbine housing include forming the turbocharger turbine housing from an ferritic stainless steel alloy that includes, by weight, about 20% to about 22% chromium, about 0% to about 0.5% nickel, about 0.5% to about 1.0% manganese, about 1.0% to about 2.5% silicon, about 1.5% to about 2.2% tungsten, about 1.3% to about 1.8% niobium, about 0.35% to about 0.45% carbon, and a balance of iron.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The inventive subject matter will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. Furthermore, as used herein, numerical ordinals such as "first," "second," "third," etc., such as first, second, and third components, simply denote different singles of a plurality unless specifically defined by language in the appended claims. All of the embodiments and implementations of the stainless steel alloys, turbocharger turbine housings, and methods for the manufacture thereof described herein are exemplary embodiments provided to enable persons skilled in the art to make or use the invention and not to limit the scope of the invention, which is defined by the claims. All percentages given herein are weight percent unless noted otherwise. Furthermore, there is no intention to be bound by any expressed or implied theory presented in the preceding technical field, background, brief summary, or the following detailed description.

The turbocharger turbine housing, usually a cast stainless steel or cast iron, is the most expensive component of the turbocharger. Reduction in cost of the housing will have a direct effect on the cost of the turbocharger. In order to withstand the high operating temperatures commonly produced by exhaust gasses impinging on the turbine housing, turbine housing materials are usually alloyed with elements such as chromium and nickel in addition to other carbide forming elements, resulting in increased cost. Reducing the content and/or eliminating these expensive alloying elements will have a direct effect on the cost of the turbine housing.

Typical embodiments of the present disclosure reside in a motor vehicle equipped with a gasoline/diesel powered internal combustion engine ("ICE") and a turbocharger. The turbocharger is equipped with a unique combination of features that may, in various embodiments, provide efficiency benefits by relatively limiting the amount of (and kinetic energy of) secondary flow in the turbine and/or compressor, as compared to a comparable unimproved system.

Figure 1:
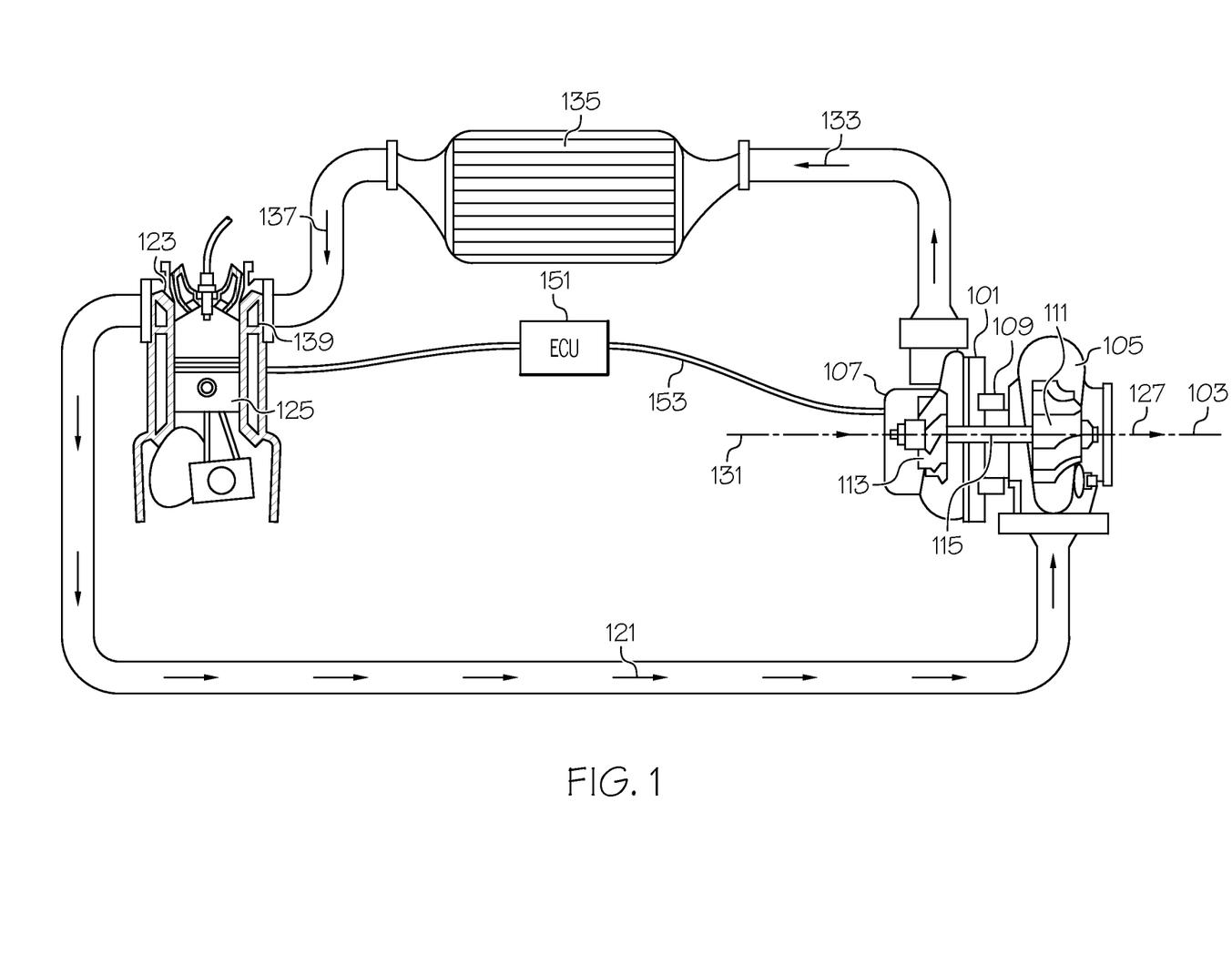
FIG. 1 is a system view of an embodiment of a turbocharged internal combustion engine in accordance with the present disclosure.

With reference to FIG. 1, an exemplary embodiment of a turbocharger 101 having a radial turbine and a radial compressor includes a turbocharger housing and a rotor configured to rotate within the turbocharger housing around an axis of rotor rotation 103 during turbocharger operation on thrust bearings and two sets of journal bearings (one for each respective rotor wheel), or alternatively, other similarly supportive bearings. The turbocharger housing includes a turbine housing 105, a compressor housing 107, and a bearing housing 109 (i.e., a center housing that contains the bearings) that connects the turbine housing to the compressor housing. The rotor includes a radial turbine wheel 111 located substantially within the turbine housing 105, a radial compressor wheel 113 located substantially within the compressor housing 107, and a shaft 115 extending along the axis of rotor rotation 103, through the bearing housing 109, to connect the turbine wheel 111 to the compressor wheel 113.

The turbine housing 105 and turbine wheel 111 form a turbine configured to circumferentially receive a high-pressure and -temperature exhaust gas stream 121 from, e.g., an exhaust manifold 123 of an internal combustion engine 125. The turbine wheel 111 (and thus the rotor) is driven in rotation around the axis of rotor rotation 103 by the high-pressure and high-temperature exhaust gas stream, which becomes a lower-pressure and lower-temperature exhaust gas stream 127 and is axially released into an exhaust system.

The compressor housing 107 and compressor wheel 113 form a compressor stage. The compressor wheel, being driven in rotation by the exhaust-gas driven turbine wheel 111, is configured to compress axially received input air (e.g., ambient air 131, or already-pressurized air from a previous-stage in a multi-stage compressor) into a pressurized air stream 133 that is ejected circumferentially from the compressor. Due to the compression process, the pressurized air stream is characterized by an increased temperature over that of the input air.

Optionally, the pressurized air stream may be channeled through a convectively cooled charge air cooler 135 configured to dissipate heat from the pressurized air stream, increasing its density. The resulting cooled and pressurized output air stream 137 is channeled into an intake manifold 139 on the internal combustion engine, or alternatively, into a subsequent-stage, in-series compressor. The operation of the system is controlled by an ECU 151 (engine control unit) that connects to the remainder of the system via communication connections 153.

Turbochargers can be designed to operate at a variety of temperatures, depending on the configuration of the turbocharger and the desired output. As used herein, the term operating temperature refers to the maximum temperature of exhaust gas designed to be experienced by the turbine housing and blade components of the turbocharger. Stainless steel GX40, well-known in the art, with its specification for chromium between 16% and 18%, is an exemplary prior art material for turbine housing applications between up to 900° C. Alternatively, D5S, also known in the art, with some nickel content, can be used for higher housing temperatures. Further alternatively, HK40, also known in the art, has less nickel content at about 19% to about 22%, but the nickel content therein is still undesirably high in terms of expense. TABLE 1, set forth below, provides the specifications for stainless steels GX40, D5S, and HK40.

TABLE 1

Composition of GX40, D5S, and HK40 Stainless Steels

| | Alloy | | |
| --- | --- | --- | --- |
| Elements | GX40 | D5S | HK40 |
| Carbon | 0.35-0.45 | 0-2.3 | 0.35-0.45 |
| Chromium | 16-18 | 1.75-2.25 | 23-27 |
| Silicon | 1-2.5 | 4.9-5.5 | 0.5-1.5 |
| Manganese | 0.5-1.0 | 0-1 | 0.4-1.5 |
| Niobium | 1.3-1.8 | — | — |
| Tungsten | 1.5-2.2 | — | — |
| Phosphorous | 0-0.04 | 0-0.07 | 0-0.03 |
| Sulphur | 0-0.03 | 0-0.03 | 0-0.03 |
| Magnesium | — | 0-0.08 | — |
| Nickel | — | 34-37 | 19-22 |
| Molybdenum | — | — | — |
| Iron | | Rest | |

As such, embodiments of the present disclosure are directed to improvements over the currently available stainless steel alloys for use in turbochargers having operating temperatures up to about 900° C. Namely, embodiments of the present disclosure are intended to provide ferritic stainless steels, that do not include nickel (or only include nickel up to a minimal amount of about 0.5%), for operating temperatures of greater than about 900° C., such as greater than about 1050° C. In particular, embodiments of the present disclosure are directed to stainless steel alloys that have a chromium content that is greater than that included in the GX40 stainless steel alloy described above. The higher chromium content has been unexpectedly found to result in a stainless steel alloy that has much better oxidation resistance at operating temperatures of greater than about 900° C., such as up to about 1200° C. The stainless steel alloys described herein include iron alloyed with various alloying elements, as are described in greater detail below in weight percentages based on the total weight of the alloy. In some embodiments described herein, alloying not particularly mentioned in the composition are understood to be excluded from the composition, excepting for inevitable impurities.

In an embodiment, the stainless steel alloy of the present disclosure includes from about 0.35% to about 0.45% carbon (C), for example about 0.38% to about 0.42% C. C has a function of improving the fluidity and castability of a melt. C also has a function of improving the castability by forming eutectic carbide with niobium (which, as discussed in greater detail below, is included in the alloy). To exhibit such functions effectively, the amount of C should be 0.35% or more. Further, C is effective for strengthening a material by solid solution strengthening. To maximize the corrosion resistance, the content of C is lowered into about 0.45% and below.

In an embodiment, the stainless steel alloy of the present disclosure includes from about 1% to about 2.5% silicon (Si), for example about 1.5% to about 2.0% Si. Si has effects of increasing the stability of its metal structure and its oxidation resistance. Further, it has a function as a deoxidizer and also is effective for improving castability and reducing pin holes in the resulting cast products, when present in an amount greater than about 1%. If the content of Si is excessive, Si deteriorates the mechanical property such as impact toughness of steel. Therefore, the content of Si is preferably limited to about 2.5% and below.

In an embodiment, the stainless steel alloy of the present disclosure includes from about 20% to about 22% chromium (Cr), for example about 20% to about 21% Cr. As will be set forth in greater detail below, it has been discovered that when the content of Cr increases, the corrosion resistance increases. On the other hand, if it is added excessively, coarse primary carbides of Cr are formed, resulting in extreme brittleness. The content of Cr is preferably limited to a maximum of about 22% so as to maintain the volume fraction of the stainless steel and the corrosion resistance. For example, an increase in chromium beyond 22 wt % increases the amount of sigma phase that forms during solidification, which makes the material brittle. Thus chromium content in the range of about 20-22% is optimum. The higher chromium content has been unexpectedly found to result in a stainless steel alloy that has much better oxidation resistance at operating temperatures of greater than about 900° C., such as up to about 1200° C.

In an embodiment, the stainless steel alloy of the present disclosure does not include any nickel. In another embodiment, nickel is limited to no greater than about 0.5% by weight. As noted above, a ferritic stainless steel is desired as an alternative to the austenitic stainless steels traditionally used for higher temperature applications. Thus, the presently described embodiments exclude nickel to maintain a low cost, and also to maintain the ferritic phase.

In an embodiment, the stainless steel alloy of the present disclosure includes from about 0.5% to about 1.0% manganese (Mn), for example about 0.6% to about 0.9% Mn. Mn is effective like Si as a deoxidizer for the melt, and has a function of improving the fluidity during the casting operation. To exhibit such function effectively, the amount of Mn is about 1.0% or less, preferably 0.9% or less. Mn generally has a content of greater than about 0.5% to adjust a metal flow rate. However, when the content of Mn is excessive, Mn is combined with sulfur of the steel and forms excessive levels of manganese sulfide, thereby deteriorating the corrosion resistance and the hot formability. Thus, the upper limit content of Mn is limited to 1.0%.

In an embodiment, the stainless steel alloy of the present disclosure includes from about 1.5% to about 2.2% tungsten (W), for example about 1.7% to about 2.0% W. Tungsten has an influence on steels very similar to that of molybdenum and it is very common to use both elements to improve corrosion resistance. As tungsten is expensive, the content should not be larger than about 2.2%. Tungsten is also included for increased hot workability of the stainless steel.

In an embodiment, the stainless steel alloy of the present disclosure includes from about 1.3% to about 1.8% niobium (Nb), for example about 1.5% to about 1.7% Nb. The heat-resistant ferritic stainless steel of the present disclosure is provided with a high castability by forming eutectic carbides of niobium as well as a high strength and good ductility.

Certain impurities may also be present in the stainless steel alloy of the present disclosure. The amounts of such impurities are minimized as much as practical. In an embodiment, phosphorus (P) may be present in the alloy, but is minimized to about 0.04% or less. P is seeded in the grain boundary or an interface, and is likely to deteriorate the corrosion resistance and toughness. Therefore, the content of P is lowered as low as possible. Preferably, the upper limit content of P is limited to 0.04% in consideration of the efficiency of a refining process. The contents of harmful impurities, such as P are as small as possible. However, due to cost concerns associated with removal of these impurities, and the P content is limited to 0.03%.

In an embodiment, sulfur (S) may be present in the alloy, but is minimized to about 0.03% or less. S in steels deteriorates hot workability and can form sulfide inclusions that influence pitting corrosion resistance negatively. It should therefore be limited to less than 0.03%. S deteriorates the hot formability, or forms MnS together with Mn, thereby deteriorating the corrosion resistance. Therefore, the content of S is lowered as low as possible. The contents of harmful impurities, such as S (sulfur), are as small as possible. However, due to cost concerns associated with removal of these impurities, the S content is limited to about 0.03%.

TABLE 2 sets forth the composition of an exemplary embodiment of the present disclosure, in accordance with the description provided above with regard to the said composition.

TABLE 2

Composition of the Stainless Steel Alloy

| Elements | Min (%) | Max (%) |
| --- | --- | --- |
| Carbon | 0.35 | 0.45 |
| Chromium | 20 | 22 |
| Silicon | 1 | 2.5 |
| Manganese | 0.5 | 1.0 |
| Niobium | 1.3 | 1.8 |
| Tungsten | 1.5 | 2.2 |
| Phosphorous | — | 0.04 |
| Sulphur | — | 0.03 |
| Iron | Rest | |

ILLUSTRATIVE EXAMPLE

The present disclosure is now illustrated by the following non-limiting example. It should be noted that various changes and modifications can be applied to the following example without departing from the scope of this invention, which is defined in the appended claims. Therefore, it should be noted that the following example should be interpreted as illustrative only and not limiting in any sense.

A representative alloy in accordance with the composition set forth above in TABLE 2 was tested using theoretical simulation software, and compared against stainless steel GX40. The tested alloy included the following approximate composition, by weight: 20.0% Cr, 0.75% Mn, 1.5% Nb, 0.5% Ni, 1.5% Si, 2.0% W, 0.4% C, 0.02% P, and 0.02% S, with a balance of Fe. Among other properties, stability of the ferritic phase at elevated temperatures is generally desirable for ferritic stainless steel turbine housing materials.

Figure 2:
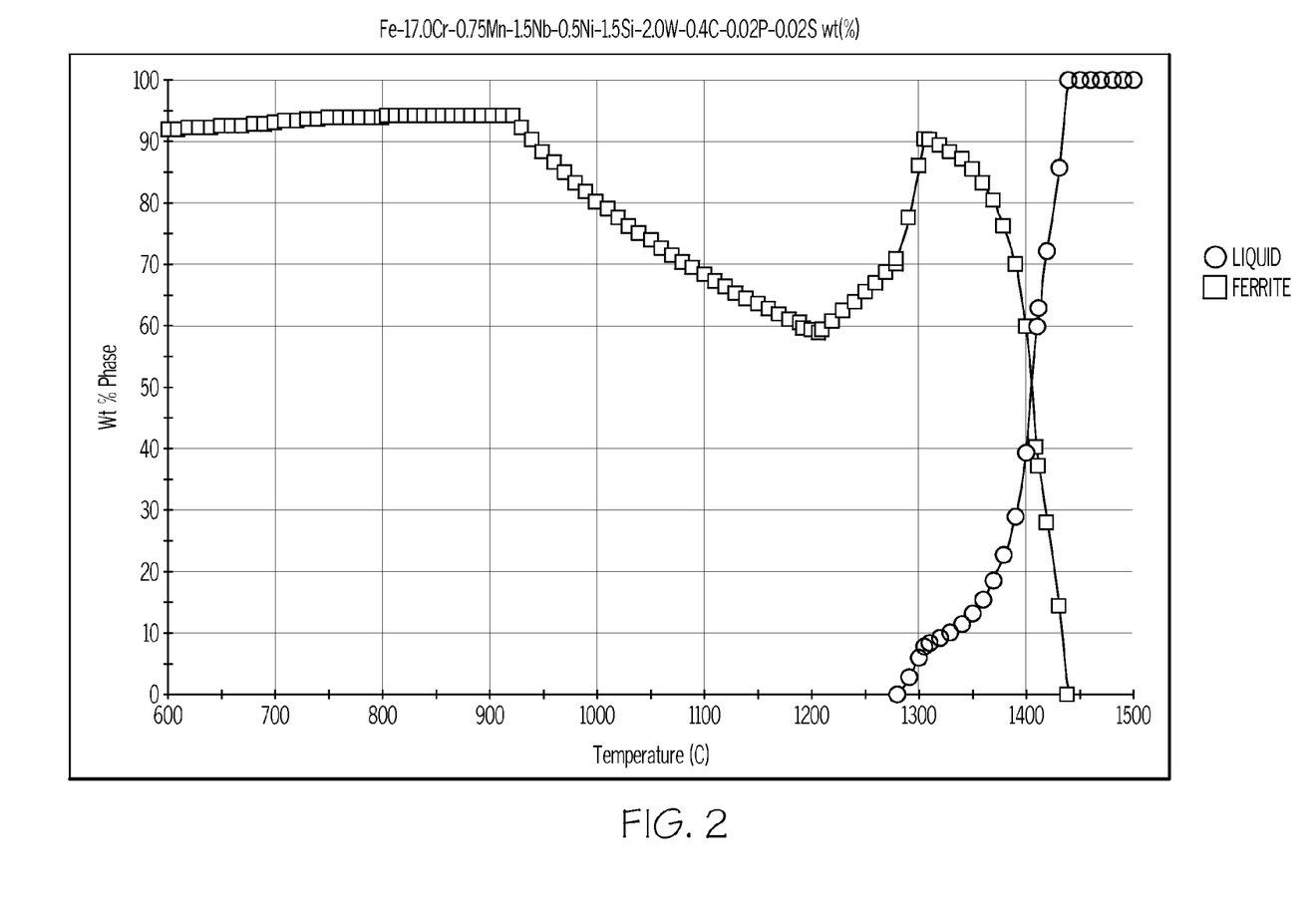
FIG. 2 is a plot illustrating the ferritic phase stability of stainless steel GX40, which is known in the prior art.
Figure 3:
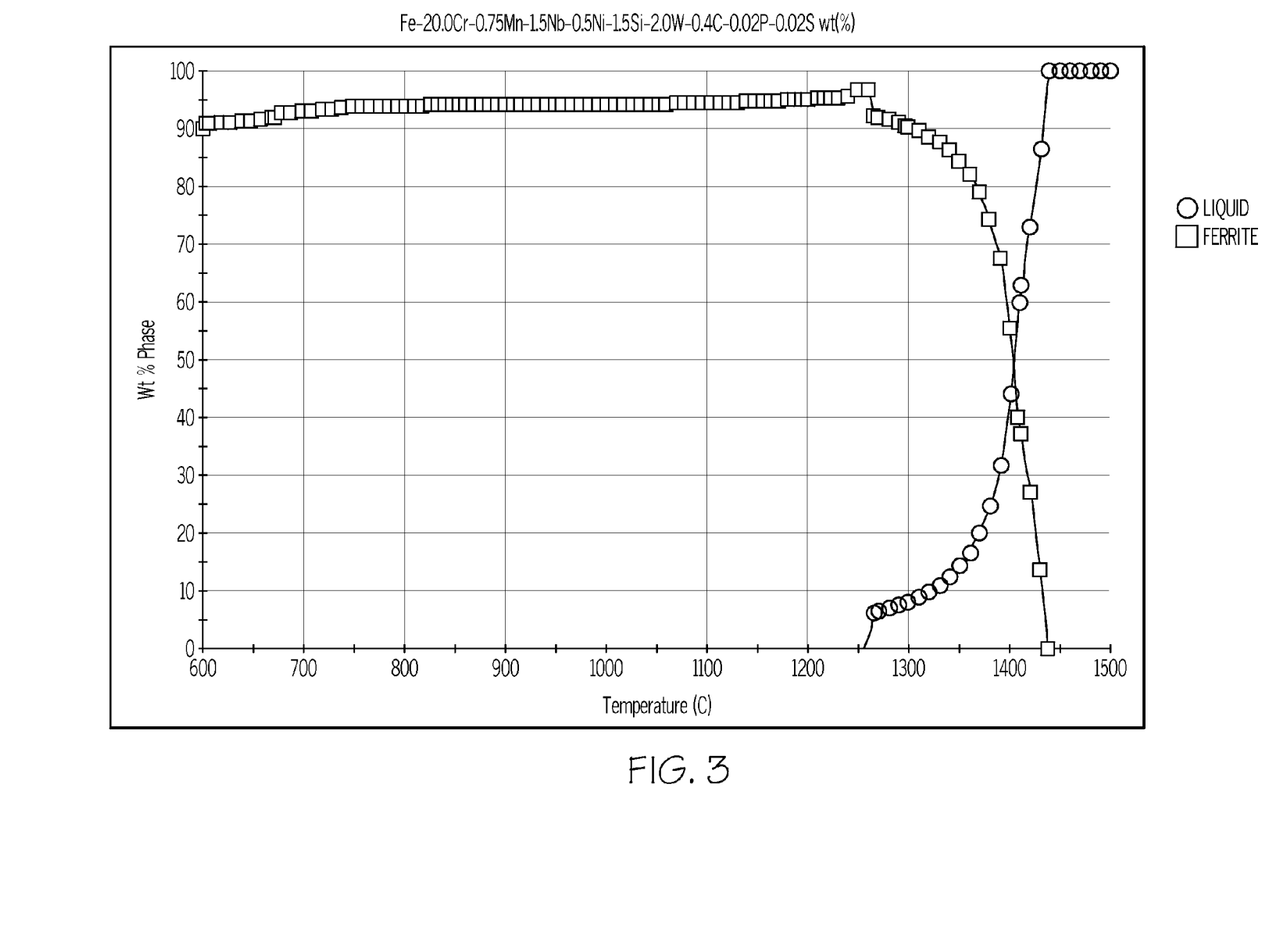
FIG. 3 is a plot illustrating the ferritic phase stability of a stainless steel in accordance with embodiments of the present disclosure.

A comparison of simulated properties from GX40 and the inventive alloy disclosed herein are shown in FIGS. 2 and 3. For example, as shown in FIG. 3, the exemplary stainless steel exhibits a higher ferritic phase stability above about 900° C. as compared to the stability of the GX40 as shown in FIG. 2. In fact, stability is maintained as shown in FIG. 3 to a temperature of greater than about 1200° C., whereas it declines markedly beyond about 900° C. as shown in FIG. 2.

TABLE 3 presents certain mechanical properties of the exemplary alloy in comparison to traditional GX40 alloys. As shown in TABLE 3, the exemplary alloy exhibits similar mechanical properties (within about 20% variance) as compared to GX40, with the exception of % elongation to failure. However, the variation in elongation is a function of casting and solidification parameters, which can be changed to improve the elongation.

TABLE 4

Comparison of mechanical properties of GX40 and Example alloy

| Material | YS (MPa) | UTS (MPa) | % Elongation to failure |
|---|---|---|---|
| GX40 | 359 | 613 | 9.8 |
| GX40+ | 454 | 542 | 2 |

As such, embodiments of the present disclosure provide numerous benefits over the prior art, such as stainless steel GX40. In particular, embodiments of the present disclosure are directed to stainless steel alloys that have a chromium content that is greater than that included in the GX40 stainless steel alloy described above. The higher chromium content has been unexpectedly found to result in a stainless steel alloy that has much better oxidation resistance at operating temperatures of greater than about 900° C., such as up to about 1200° C. Thus, due to lower cost and higher oxidation resistance, embodiments of the present disclosure are suitable as a lower cost alloy for turbine housing materials (for example) for operation up to about 1050° C.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A ferritic stainless steel alloy, consisting of, by weight:
   20% to 22% chromium;
   0.5% to 1.0% manganese;
   1.0% to 2.5% silicon;
   1.5% to 2.2% tungsten;
   1.3% to 1.8% niobium;
   0.35% to 0.45% carbon;
   phosphorus at no more than 0.04%;
   sulfur at not more than 0.03%; and
   a balance of iron and unavoidable/inevitable impurities.

2. The ferritic stainless steel alloy of claim 1 consisting of 20% to 21% chromium.

3. The ferritic stainless steel alloy of claim 1 consisting of 0.6% to 0.9% manganese.

4. The ferritic stainless steel alloy of claim 1 consisting of 1.5% to 2.0% silicon.

5. The ferritic stainless steel alloy of claim 1 consisting of 1.7% to 2.0% tungsten.

6. The ferritic stainless steel alloy of claim 1 consisting of 1.5% to 1.7% niobium.

7. The ferritic stainless steel alloy of claim 1 consisting of 0.38% to 0.42% carbon.

8. A turbocharger turbine housing comprising:
   a ferritic stainless steel alloy, wherein the ferritic stainless steel alloy consists of, by weight:
   20% to 22% chromium;
   0.5% to 1.0% manganese;
   1.0% to 2.5% silicon;
   1.5% to 2.2% tungsten;
   1.3% to 1.8% niobium;
   0.35% to 0.45% carbon;
   phosphorus at no more than 0.04%;
   sulfur at not more than 0.03%; and
   a balance of iron and unavoidable/inevitable impurities.

9. The turbocharger turbine housing of claim 8 consisting of 20% to 21% chromium.

10. The turbocharger turbine housing of claim 8 consisting of 0.6% to 0.9% manganese.

11. The turbocharger turbine housing of claim 8 consisting of 1.5% to 2.0% silicon.

12. The turbocharger turbine housing of claim 8 consisting of 1.7% to 2.0% tungsten.

13. The turbocharger turbine housing of claim 8 consisting of 1.5% to 1.7% niobium.

14. The turbocharger turbine housing of claim 8 consisting of 0.38% to 0.42% carbon.

15. The turbocharger comprising the turbocharger turbine housing of claim 8 that operates at a temperature of up to 1050° C.

16. A method of fabricating a turbocharger turbine housing, the method comprising the step of:
   forming the turbocharger turbine housing from a ferritic stainless steel alloy, wherein the ferritic stainless steel alloy consists of, by weight:
   20% to 22% chromium;
   0.5% to 1.0% manganese;
   1.0% to 2.5% silicon;
   1.5% to 2.2% tungsten;
   1.3% to 1.8% niobium;
   0.35% to 0.45% carbon;
   phosphorus at no more than 0.04%;

sulfur at not more than 0.03%; and
a balance of iron and unavoidable/inevitable impurities.

\* \* \* \* \*

UNITED STATES PATENT AND TRADEMARK OFFICE
CERTIFICATE OF CORRECTION

PATENT NO. : 9,499,889 B2  
APPLICATION NO. : 14/188083  
DATED : November 22, 2016  
INVENTOR(S) : Chintalapati et al.

Page 1 of 1

It is certified that error appears in the above-identified patent and that said Letters Patent is hereby corrected as shown below:

On the Title Page

Item (72) inventor Pavan Chintalapati's country "(FR)" should be changed to --IN--

Signed and Sealed this
Eighteenth Day of April, 2017

Michelle K. Lee
*Director of the United States Patent and Trademark Office*